3,120,555
ALKOXYCARBONYLALKYL HALOPHENYL
CARBONATES
Joseph W. Baker, Kirkwood, and Raymond E. Stenseth,
Webster Groves, Mo., assignors to Monsanto Chemical
Company, St. Louis, Mo., a corporation of Delaware
No Drawing. Filed May 18, 1962, Ser. No. 195,983
11 Claims. (Cl. 260—463)

This invention relates to a novel class of halophenyl chloroformate derivatives. More particularly, this invention is concerned with a class of new organic compounds which are alkoxycarbonylalkyl halophenyl carbonates. Such carbonates are found to possess useful and unexpected biological activity.

The novel compounds of this invention have the general formula

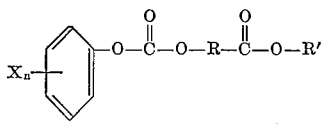

where X is selected from a group consisting of chlorine and bromine, n is an integer from 3 to 5, R is alkylene containing from 2 to 4 carbon atoms, and R' is alkyl containing from 1 to 4 carbon atoms.

This class of compounds can be prepared by causing a halophenyl chloroformate to react with a selected alkyl ester of a hydroxy acid to produce the desired alkoxycarbonylalkyl halophenyl carbonate. In such reactions, it is preferred to add a tertiary amine to the reaction mixture to serve as an acceptor for the hydrogen chloride formed during the reaction. Examples of tertiary amines which can be used as quinaldine, triethylamine, dimethylaniline, diethylaniline, pyridine, and the like. Examples of reactions using an amine acceptor yielding selected alkoxycarbonylalkyl halophenyl carbonates are as follows:

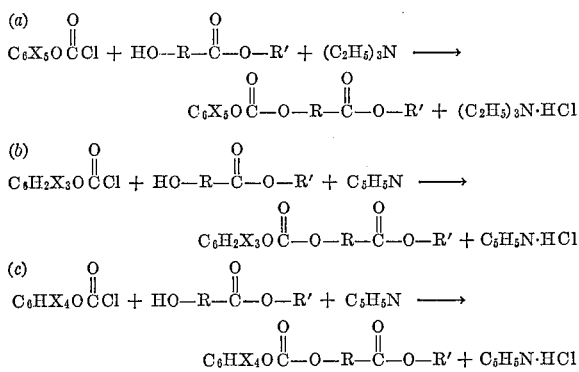

In practicing the preparations of Equations a, b or c, it is also preferred to use an inert organic solvent for the halophenyl chloroformate and the alkyl ester of a hydroxy acid. Among the suitable solvents are benzene, toluene, xylene, hexane, heptane, octane, propyl ether, ethyl ether, tetrahydrofuran, dioxane and the like. The reaction temperatures employed in preparing the new compounds will depend upon the particular reactants utilized to obtain a desired end product.

It should be noted that, although both are preferred, neither the tertiary amine nor the inert organic solvent are essential to the preparation of the compounds of this invention. In the absence of an acceptor amine, the hydrogen chloride which forms during the reaction can be boiled off.

The invention will be more fully understood by reference to the following examples. These examples, however, are given for the purpose of illustration only and are not to be construed as limiting the scope of the present invention in any way.

Example I

A suitable reaction vessel is charged with 16.4 grams (0.05 mole) of pentachlorophenyl chloroformate, 5.9 grams (0.05 mole) of ethyl lactate, and 150 ml. ether to dissolve the starting materials. The solution is cooled to −20° C. and stirred during the dropwise addition of 4.0 grams (0.05 mole) of pyridine, dissolved in 25 ml. of ether, over a period of about 25 minutes. During the addition of the pyridine, the temperature is maintained at −20° C. The addition of pyridine to the solution forms a precipitate of pyridine hydrochloride which is immediately removed by filtration and washed with ether. The combined filtrate and washings are treated to remove the ether, leaving a white solid. The white solid is dissolved in Skellysolve B (an essentially n-hexane solvent having a boiling range of 60–70° C.). Recrystallization yields 6.8 grams of 1-ethoxycarbonylethyl pentachlorophenyl carbonate having a melting point, using Fisher-Johns melting point apparatus, of 107–108° C. Analysis shows 43.3% chlorine, as against a calculated value of 43.2% for $C_{12}H_9Cl_5O_5$.

Example II

In a suitable reaction vessel, 7.3 grams (0.05 mole) of propyl 2-hydroxybutyrate is reacted with 16.5 grams (0.05 mole) of pentachlorophenyl chloroformate according to the procedure set forth in Example I. There is obtained 1 - propoxycarbonylpropyl pentachlorophenyl carbonate in good yield.

Example III

In a suitable reaction vessel, 5.2 grams (0.05 mole) of methyl lactate is reacted with 19.7 grams (0.05 mole) of 2,4,6-tribromophenyl chloroformate according to the procedure set forth in Example I. There is obtained 1-methoxycarbonylethyl 2,4,6-tribromophenyl carbonate in good yield.

Example IV

In a suitable reaction vessel, 6.6 grams (0.05 mole) of methyl 2-hydroxybutyrate is reacted with 14.7 grams (0.05 mole) of 2,3,4,6-tetrachlorophenyl chloroformate according to the procedure set forth in Example I. There is obtained 1-methoxycarbonylpropyl 2,3,4,6-tetrachlorophenyl carbonate in good yield.

Example V

In a suitable reaction vessel, 6.6 grams (0.05 mole) of isopropyl lactate is reacted with 13.0 grams (0.05 mole) of 2,4,5-trichlorophenyl chloroformate according to the procedure set forth in Example I. There is obtained 1-isopropoxycarbonylethyl 2,4,5-trichlorophenyl carbonate in good yield.

Example VI

In a suitable reaction vessel, 6.6 grams (0.05 mole) of methyl 2-hydroxyvalerate is reacted with 27.6 grams (0.05 mole) of pentabromophenyl chloroformate according to the procedure set forth in Example I. There is obtained 1-methoxycarbonylbutyl pentabromophenyl carbonate in good yield.

Example VII

In a suitable reaction vessel, 7.3 grams (0.05 mole) of ethyl 2-hydroxy-3-methylbutyrate is reacted with 23.6 grams (0.05 mole) of 2,3,4,6-tetrabromophenyl chloroformate according to the procedure set forth in Example I. There is obtained 1-ethoxycarbonyl-2-methylbutyl 2,3,4,6-tetrabromophenyl carbonate in good yield.

Example VIII

In a suitable reaction vessel, 8.0 grams (0.05 mole) of propyl 2-hydroxy-3-methylbutyrate is reacted with 19.7 grams (0.05 mole) of 2,4,5-tribromophenyl chloroformate according to the procedure set forth in Example I. There is obtained 1-propoxycarbonyl-2-methylpropyl 2,4,5-tribromophenyl carbonate in good yield.

Example IX

In a suitable reaction vessel, 8.7 grams (0.05 mole) of butyl 2-hydroxyvalerate is reacted with 13.0 grams (0.05 mole) of 2,4,6-trichlorophenyl chloroformate according to the procedure set forth in Example I. There is obtained 1-butoxycarbonylbutyl 2,4,6-trichlorophenyl carbonate in good yield.

The products of the present invention are useful as microbiocides adapted to be employed for the control of bacterial and fungal organisms. In a representative test, 1-ethoxycarbonylethyl pentachlorophenyl carbonate is active against *Staphylococcus aureus* at a dilution in excess of one part per million.

While this invention has been described with respect to certain specific embodiments, it is not so limited. It is to be understood that variations and modifications thereof may be made without departing from the spirit and scope of this invention.

What is claimed is:

1. A compound of the formula

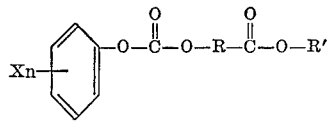

where X is selected from a group consisting of chlorine and bromine, $n$ is an integer from 3 to 5, R is alkylene containing from 2 to 4 carbon atoms, and R' is alkyl containing from 1 to 4 carbon atoms.

2. A compound of the formula

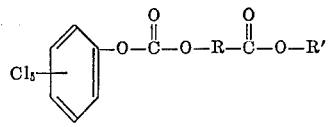

where R is alkylene containing from 2 to 4 carbon atoms, and R' is alkyl containing from 1 to 4 carbon atoms.

3. 1-ethoxycarbonylethyl pentachlorophenyl carbonate.
4. 1-propoxycarbonylpropyl pentachlorophenyl carbonate.
5. 1-methoxycarbonylethyl 2,4,6-tribromophenyl carbonate.
6. 1-methoxycarbonylpropyl 2,3,4,6-tetrachlorophenyl carbonate.
7. Isopropoxycarbonylethyl 2,4,5-trichlorophenyl carbonate.
8. 1-methoxycarbonylbutyl pentabromophenyl carbonate.
9. 1-ethoxycarbonyl-2-methylbutyl 2,3,4,6-tetrabromophenyl carbonate.
10. 1-propoxycarbonyl-2-methylpropyl 2,4,5-tribromophenyl carbonate.
11. 1-butoxycarbonylbutyl 2,4,6-tricholorophenyl carbonate.

No references cited.